May 31, 1938.     H. D. VALLE     2,119,260
DOUGH CUTTING DEVICE
Filed Oct. 2, 1936.
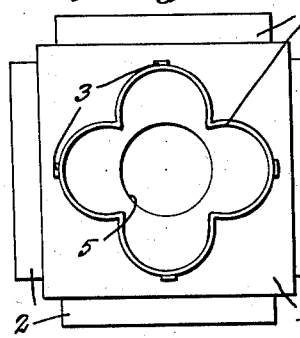
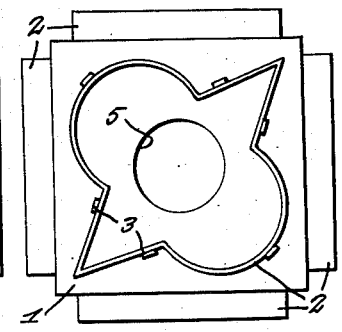
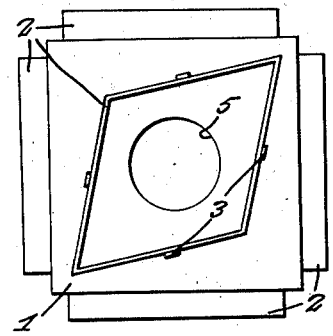
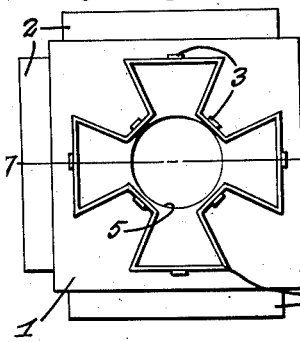
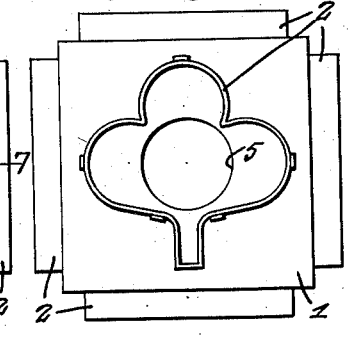
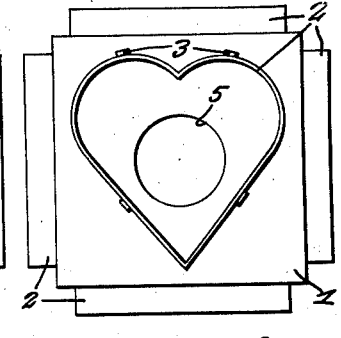
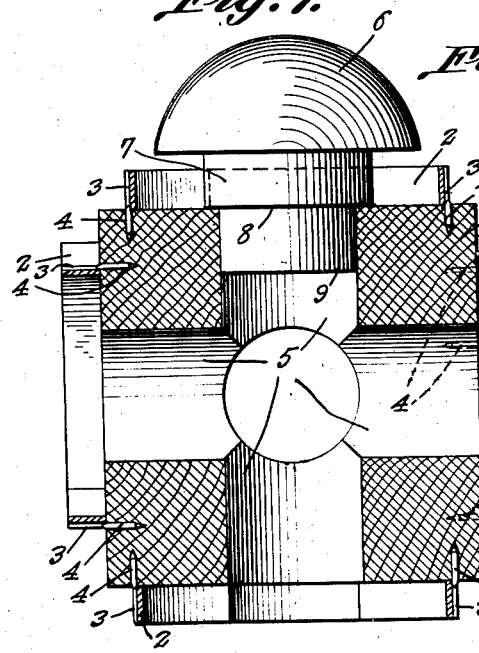
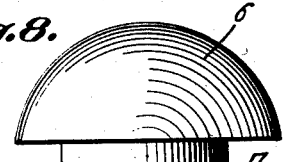
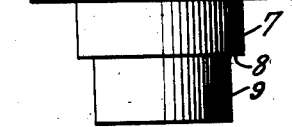
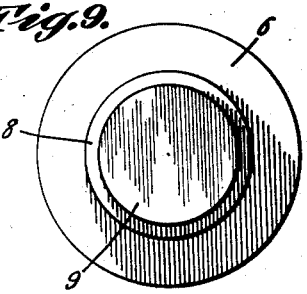
Humbert D. Valle, INVENTOR
BY Victor J. Evans & Co.
ATTORNEYS Patented May 31, 1938

2,119,260

UNITED STATES PATENT OFFICE 2,119,260

DOUGH CUTTING DEVICE

Humbert D. Valle, Philadelphia, Pa.

Application October 2, 1936, Serial No. 103,751

2 Claims. (Cl. 30—301)

This invention relates to dough cutting devices, and its general object is to provide a device of that character in a single unit which is capable of use for cutting dough into pieces of different designs in an easy and expeditious manner, for the purpose of making biscuits, cakes, cookies and the like of different shapes and sizes.

Another object of the invention is to provide a dough cutter of the type set forth from which the dough will readily drop after being cut thereby and the device is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figures 1 to 6 inclusive illustrate the six cutting faces and the different designs of cutting dies of the form of my device shown.

Figure 7 is a vertical sectional view taken through the device, with the handle thereof in elevation.

Figure 8 is a side view of the handle.

Figure 9 is a bottom plan view thereof.

Figure 10 is a fragmentary perspective view illustrating the penetrating means for securing the cutters or dies to the body of the device.

Referring to the drawing in detail, it will be noted that my cutting device includes a body 1 in the form of a cube to provide six faces, each of which has a cutting die 2 secured thereto, and the cutting die of each face is of different design, as clearly shown in Figures 1 to 6 inclusive.

The cutting dies or blades are preferably formed from a single strip of material shaped in the desired design, and are fixed to the respective faces of the body through the instrumentality of penetrating means that include relatively flat lug portions 3 riveted or otherwise secured to the outer sides of the blades, and extending from the lug portions 3 are shanks 4 that terminate in penetrating points to be driven into the body, which is preferably made from wood or other like material to receive the shanks, as clearly shown in Figure 7. However, the body may be made of any material, and the cutting dies or blades may be secured to the respective faces thereof by means other than that shown.

Extending into each of the faces of the body 1 and centrally thereof is a bore 5 and the bores have their inner ends in communication with each other, to act as vent means, to overcome any suction action that may take place during the use of the device, and the bores likewise act to provide seats for a handle, of the type as best shown in Figure 8.

The handle includes a dome-shaped outer gripping portion 6, in the form as shown, and a plug portion 7 formed on or otherwise secured thereto. The plug portion is reduced to provide a shoulder 8 and a plug 9, and from Figure 7, it will be obvious that the plug 9 is receivable in any one of the bores for frictional engagement therewith, for detachably securing the handle to the body, and the shoulder 8 contacts the face of the body to act as a limiting means.

From the above description and disclosure of the drawing, it will be obvious that I have provided a dough cutting device that is capable of use for cutting dough into pieces of different designs, and in the use of the device, the plug 9 of the handle is inserted into a bore of one of the faces of the body, and the die or cutting blade of the opposed face can then be put into use for cutting the dough into pieces of one design. When the desired number of pieces of that design are completed, the handle is removed from the first mentioned bore and inserted in another bore, to present a die or cutting blade of a different design for use, therefore it will be apparent that any one of the dies can be put into use when desired, merely by changing the position of the handle with respect to the body.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A dough cutting device comprising a body in the form of a cube, a cutting die for each face of the body and being in the form of a blade, each die being of a different design, lugs secured to the outer faces of the dies, penetrating means formed on the lugs and extending into the body for securing the dies to the faces thereof, said body having a bore extending into each of the faces thereof with the inner ends of the bores communicating with each other, a handle for the body and including a dome-shaped gripping portion, and plug means formed on the dome-shaped gripping portion to be detachably secured in any one of the bores for changeable association of the handle with respect to the cutting dies to dispose any one of the latter in position for use.

2. A dough cutting device comprising a multiple faced body, a cutting die in the form of a blade for each face and secured thereto, each die being of different design and formed from a single strip of material, said body having bores extending into each of the faces thereof and communicating with each other, a handle for the body and detachably securable in any one of the bores for changeable association therewith to dispose any one of the cutting dies in position for use.

HUMBERT D. VALLE.